United States Patent
Yu et al.

(10) Patent No.: US 8,643,605 B2
(45) Date of Patent: Feb. 4, 2014

(54) GESTURE BASED DOCUMENT EDITOR

(75) Inventors: Kun Yu, Beijing (CN); Kongqiao Wang, Beijing (CN); Jari A. Kangas, Tampere (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 767 days.

(21) Appl. No.: 11/284,141

(22) Filed: Nov. 21, 2005

(65) Prior Publication Data

US 2007/0115264 A1 May 24, 2007

(51) Int. Cl.
*G06F 3/033* (2013.01)

(52) U.S. Cl.
USPC ............................ 345/173; 345/157; 715/863

(58) Field of Classification Search
USPC .................................. 345/173, 157; 715/863
See application file for complete search history.

(56) References Cited

U.S. PATENT DOCUMENTS

| | | | | |
|---|---|---|---|---|
| 4,680,804 A | * | 7/1987 | Kuzunuki et al. ............. | 382/185 |
| 5,220,649 A | * | 6/1993 | Forcier .......................... | 715/273 |
| 5,347,295 A | * | 9/1994 | Agulnick et al. ............. | 345/156 |
| 5,404,442 A | * | 4/1995 | Foster et al. .................. | 715/769 |
| 5,404,458 A | * | 4/1995 | Zetts ............................... | 710/73 |
| 5,481,278 A | * | 1/1996 | Shigematsu et al. .......... | 345/179 |
| 5,513,309 A | | 4/1996 | Meier et al. | |
| 5,523,775 A | * | 6/1996 | Capps ............................ | 345/179 |
| 5,528,743 A | * | 6/1996 | Tou et al. ....................... | 715/234 |
| 5,613,019 A | * | 3/1997 | Altman et al. ................ | 382/311 |
| 5,677,710 A | * | 10/1997 | Thompson-Rohrlich ..... | 345/173 |
| 5,682,439 A | * | 10/1997 | Beernink et al. ............... | 382/187 |
| 5,710,831 A | | 1/1998 | Beernink et al. | |
| 5,809,267 A | * | 9/1998 | Moran et al. ................... | 715/863 |
| 5,867,150 A | * | 2/1999 | Bricklin et al. ................ | 345/173 |
| 5,880,743 A | * | 3/1999 | Moran et al. ................... | 345/473 |
| 6,331,840 B1 | | 12/2001 | Nielson et al. | |
| 6,525,749 B1 | * | 2/2003 | Moran et al. ................... | 715/863 |
| 6,545,669 B1 | * | 4/2003 | Kinawi et al. ................. | 345/173 |
| 6,941,507 B2 | * | 9/2005 | Iwema et al. .................. | 715/200 |
| 7,036,077 B2 | * | 4/2006 | Saund et al. ................... | 715/273 |
| 7,554,530 B2 | * | 6/2009 | Mizobuchi et al. ............ | 345/173 |
| 2002/0076109 A1 | * | 6/2002 | Hertzfeld et al. .............. | 382/229 |
| 2002/0080126 A1 | * | 6/2002 | Keely et al. ................... | 345/179 |
| 2003/0179235 A1 | * | 9/2003 | Saund et al. ................... | 345/764 |
| 2003/0182630 A1 | * | 9/2003 | Saund et al. ................... | 715/530 |
| 2004/0054701 A1 | | 3/2004 | Garst | |

(Continued)

FOREIGN PATENT DOCUMENTS

| | | |
|---|---|---|
| EP | 1335272 A2 | 8/2003 |
| GB | 2274186 A | 7/1994 |
| WO | 9208183 A1 | 5/1992 |
| WO | 0016186 A2 | 3/2000 |

OTHER PUBLICATIONS

Canadian Office Action dated Mar. 15, 2010.
Russian Office Action dated Jun. 10, 2010.

(Continued)

*Primary Examiner* — Dorothy Harris
(74) *Attorney, Agent, or Firm* — Ziegler IP Law Group, LLC (57) ABSTRACT

A method for editing objects on a device comprising forming a first path on a touch screen with a pointing device. The first path at least partially encloses an object. The at least partially enclosed object is automatically selected. A second path is formed at a predetermined area on the touch screen with the pointing device. The second path activates an editing operation.

15 Claims, 11 Drawing Sheets

(56) References Cited

U.S. PATENT DOCUMENTS

| | | | |
|---|---|---|---|
| 2004/0119763 A1* | 6/2004 | Mizobuchi et al. | 345/863 |
| 2004/0140956 A1* | 7/2004 | Kushler et al. | 345/168 |
| 2004/0174399 A1* | 9/2004 | Wu et al. | 345/863 |
| 2006/0112349 A1* | 5/2006 | Clow et al. | 715/780 |
| 2006/0210172 A1* | 9/2006 | Sutanto et al. | 382/229 |
| 2007/0109281 A1* | 5/2007 | Simmons et al. | 345/179 |

OTHER PUBLICATIONS

Canadian Office Action dated May 31, 2011.
Supplementary European Search Report dated Oct. 19, 2012.

* cited by examiner

GESTURE BASED DOCUMENT EDITOR

BACKGROUND OF THE INVENTION

1. Field of the Invention

The present invention generally relates to touch screen user interfaces and in particular to a gesture based document editor.

2. Brief Description of Related Developments

The usage of pen or stylus input methods on mobile devices such as for example, mobile phones, personal digital assistants and the like is becoming ever more popular. One of the most commonly used functions of the pen on these mobile devices is the inputting of text. As such, convenient pen based text editing systems are in demand.

In order to make full use of the limited screen area on devices such as mobile devices for writing, a full screen user interface is widely adopted. Because of the full screen user interface, most of the operations for editing text, e.g. text selection, deletion, moving, copying and pasting cannot be performed in the text area as easily as it can be performed using a box-based pen input user interface.

Traditionally, the strokes written in the text area are regarded as components of a written character so the user has to put down the pen and resort to using keys for the text editing operations. In some instances the pen can manage all the text editing operations but the user has to conduct the text editing in a very inefficient character-by-character manner. There are other solutions that require the user of the mobile device to switch to a box-based user interface for text editing thus, enabling the text selection and edit operations in the text area.

SUMMARY OF THE EXEMPLARY EMBODIMENTS

The present invention is directed to a gesture based document editor. In accordance with an exemplary embodiment, a method for editing objects on a device is provided. The method comprises forming a first path on a touch screen with a pointing device. The first path at least partially encloses an object. The at least partially enclosed object is automatically selected. A second path is formed at a predetermined area on the touch screen with the pointing device. The second path activates an editing operation.

In accordance with an exemplary embodiment, a device for editing objects is provided. The device comprises a display processor, a touch screen coupled to the display processor, a first and second input detection unit coupled to the display processor, an input recognition unit coupled to the display processor and an editing unit coupled to the input recognition unit. The first input detection unit receives a first input in the form of a user forming a first path on the touch screen with a pointing device. The second input detection unit receives a second input in the form of the user forming a second path on the touch screen with the pointing device. The input recognition unit detects the first path at least partially enclosing an object. The input recognition unit also detects the second path, which is formed at a predetermined area of the touch screen and generates an editing signal. The editing unit activates an editing function in response to the editing signal.

In accordance with an exemplary embodiment, a computer program product is provided. The computer program product has a computer useable medium having computer readable code means embodied therein for causing a computer to edit objects on a device. The computer program product includes computer readable program code means to cause a computer to form a first path, as defined with a pointing device on a touch screen, that at least partially encloses an object. The computer program product also includes computer readable program code means to cause a computer to automatically select the at least partially enclosed object. The computer program product includes computer readable program code means to cause a computer to form a second path, as defined with the pointing device at a predetermined area of the touch screen, wherein the second path activates an editing operation.

In accordance with still another exemplary embodiment, an article of manufacture is provided. The article of manufacture has a computer useable medium having computer readable program code means embodied therein for causing a computer to edit objects on a device. The computer readable code means in the article of manufacture has computer readable program code means for causing a computer to form a first path, as defined on a touch screen with a pointing device, that at least partially encloses an object. The computer readable program code means in the article of manufacture also causes a computer to automatically select the at least partially enclosed object. The computer readable program code means in the article of manufacture also causes a computer to form a second path, as defined at a predetermined area on the touch screen with the pointing device, the second path activating an editing operation

BRIEF DESCRIPTION OF THE DRAWINGS

The foregoing aspects and other features of the present invention are explained in the following description, taken in connection with the accompanying drawings, wherein.

DETAILED DESCRIPTION OF THE EXEMPLARY EMBODIMENTS

Figure 1:
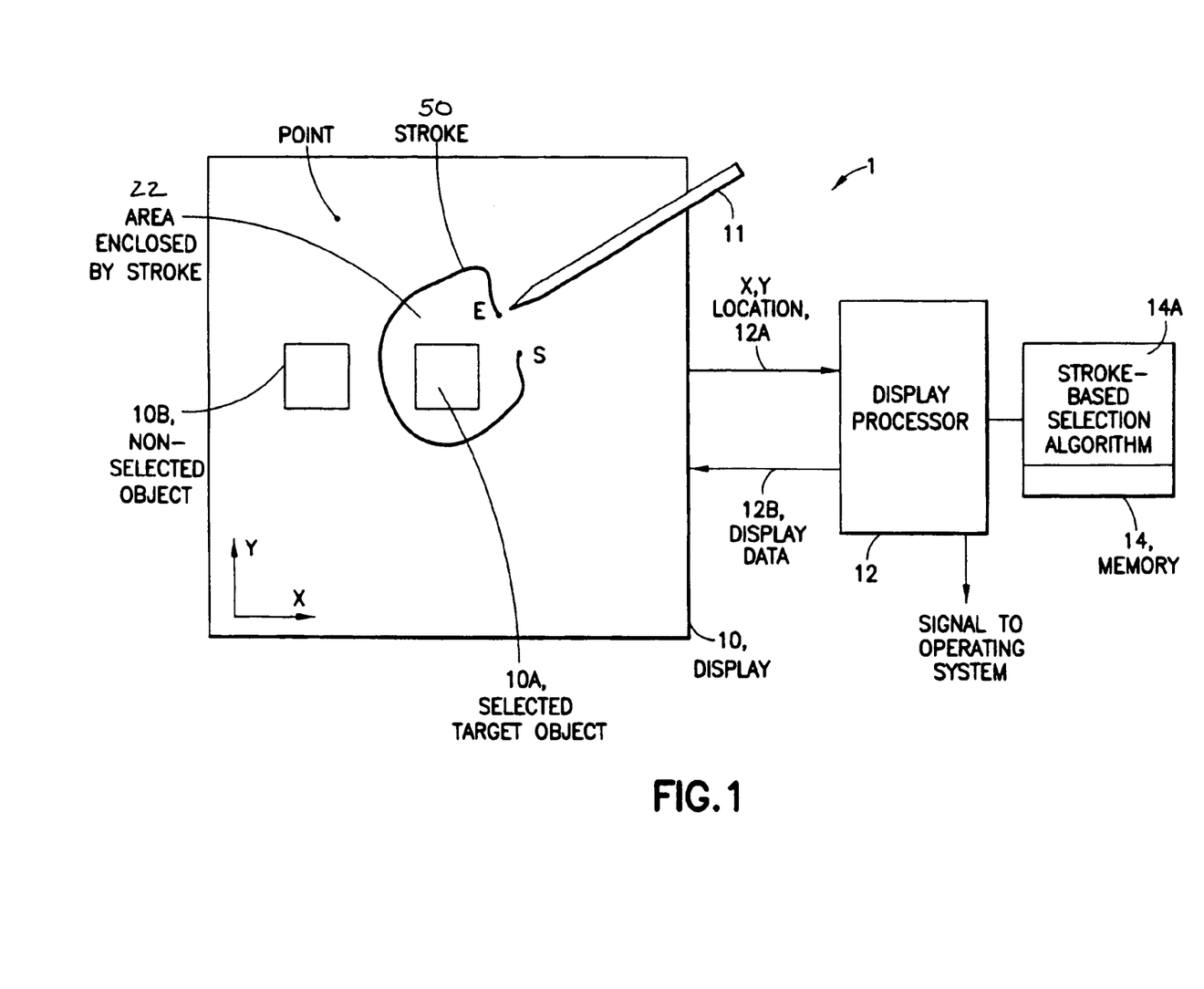
FIG. 1 is a block diagram of a portion of a device that incorporates a touch screen and display processor that operates in accordance with an exemplary embodiment.

FIG. 1 illustrates one embodiment of a system incorporating features of the present invention. Although the present invention will be described with reference to the exemplary embodiments shown in the drawings and described below, it should be understood that the present invention can be embodied in many alternate forms of embodiments.

FIG. 1 is a simplified block diagram of a portion of a device 1 having a display processor 12 and a touch screen display 10 incorporating features of the present invention. A pointing device 11, such as for example, a stylus, pen or simply the user's finger can be used with the touch screen display 10. In alternate embodiments any suitable pointing device may be used. The display 10 and pointing device 11 form a user interface of the device 1, and may be configured as a graphical user interface. The display processor 12 is coupled to a memory 14 that stores a gesture or stroke based selection algorithm for causing the display processor 12 to operate in accordance with this invention. A first communication or data link or connection 12A exists between the display 10 and the processor 12 for the processor 12 to receive coordinate information that is descriptive or indicative of the location of the tip or end of the pointing device 11 relative to the surface of the display 10. The display 10 is typically pixelated, and may contain liquid crystal (LC) or some other type of display pixels. In alternate embodiments any suitable type of display may be utilized.

The display processor 12 generally provides display data directly or indirectly to the display 10 over a second communication or data link or connection 12B for activating desired pixels, as is well known in the art. A given coordinate location, such as for example an x-y location on the surface of the display 10 may correspond directly or indirectly to one or more display pixels, depending on the pixel resolution and the resolution of the touch screen itself. A single point on the touch screen display 10 (a single x-y location) may thus correspond to one pixel or to a plurality of adjacent pixels. Differing from a single point, a path, stroke or line 50 (as these terms are used interchangeably herein) may have a starting x-y point (S) and an ending x-y point (E), and may include some number of x-y locations between S and E. Bringing an end of the pointing device 11 in proximity to or in contact with the surface of the display 10 may mark starting point S of the stroke 50 and subsequently moving or lifting the end of the pointing device 11 away from the surface of the display 10 may mark the end point E of the stroke 50. In one embodiment, the pointing device 11 does not need to make contact with the surface of the display 10 to cause the formation of, or recognition of an input signal to form a mark. Bringing the end of the pointing device 11 in proximity to or in contact with the surface of the display 10 and subsequently moving or lifting the end of the pointing device 11 away from the surface of the display 10, without moving the tip of the pointing device over the surface of the display 10, may mark a single point.

Note that the stroke 50 can partially or substantially encompass or enclose an area or object on the surface of the display 10 in order to activate the selection of the object, as will be described below. In accordance with an exemplary embodiment, if the area 22 contains a display object and is partially or substantially enclosed by a stroke, then the object within the enclosed area becomes a selected target object 10A. Other display objects, not within the area (within the bounds of the stroke) are not "selected", as that term is commonly understood, and can be referred to as a non-selected object 10B.

Figure 2:
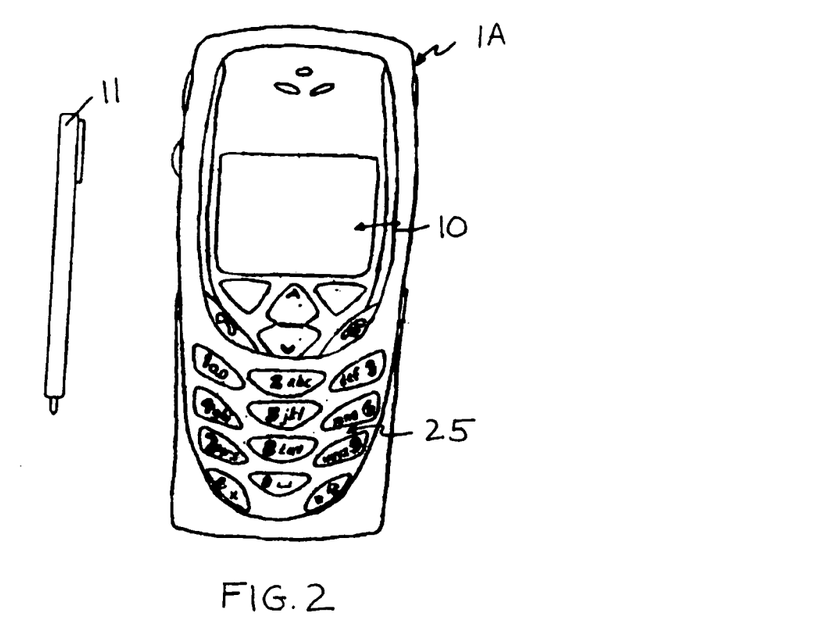
FIG. 2 illustrates an embodiment of the device of FIG. 1 in accordance with an exemplary embodiment.
Figures 3A, 3B:
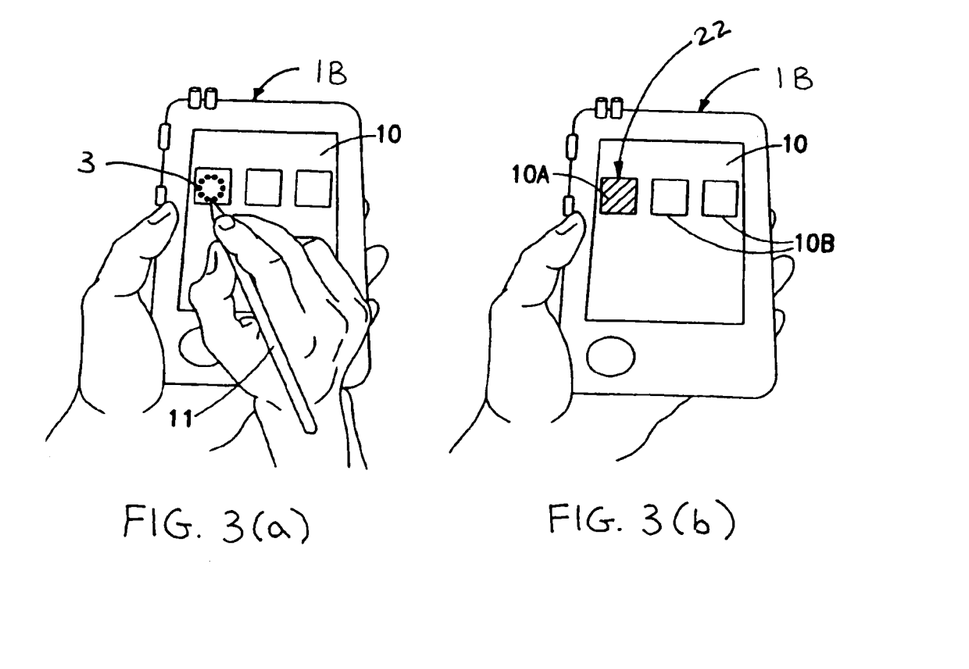
FIGS. 3(a) and 3(b) illustrate yet another embodiment of the device of FIG. 1 and illustrate a process for selecting an object in accordance with an exemplary embodiment.

In accordance with an exemplary embodiment, the device 1, may be for example, a cellular telephone 1A as shown in FIG. 2. The cellular telephone 1A may have a keypad 25, a touch screen display 10 and a pointing device 11 for use on the touch screen display 10. In accordance with another exemplary embodiment, the device 1 may be a PDA 1B as shown in FIGS. 3(a) and 3(b). The PDA 1B may also have a touch screen display 10 and a pointing device 11. In still other alternate embodiments, the device 1 may be a personal communicator, a tablet computer, a laptop or desktop computer, or any other suitable device capable of containing the touch screen display 10 and supported electronics such as the display processor 12. Note that the display processor 12 need not be dedicated to the task of operating the touch screen display 10, and may be responsible for performing other tasks in the device 1 as well. Also, the display processor 12 may not in and of itself actually select one or more displayed objects that are generally encompassed within an area defined by a stroke. Instead, the display processor 12 may send a signal to a higher level of software, such as the operating system, for identifying the object(s) indicated or selected by the user with the pointing device 11.

Figure 4A:
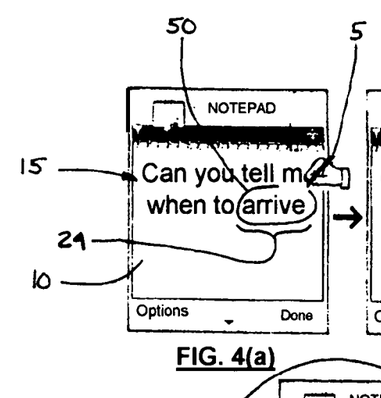
FIGS. 4(a)-4(g) illustrate object editing in accordance with an exemplary embodiment.

Referring now to FIGS. 3(a), 3(b), 4(a) through 4(g) and 5(a), a method for selecting an object in accordance with an exemplary embodiment will now be described. As discussed above, the touch screen display 10 and the pointing device 11 may be configured as a user interface of the device 1. In this exemplary embodiment, a user of the device 1 may desire to select an object for editing that is displayed on the touch screen display 10 as part of an application or other program stored or operating in the device 11. The editing functions can include for example, a copy and paste function, a cut and paste function, a move function and a delete function. As shown in FIG. 4(a), a series of text characters are shown in the display 10. In alternate embodiments, the object(s) on the display may be for example, a figure, drawing or any other desired object located on the display 10 of device 1. In alternate embodiments, there may a group of objects 3, as can be seen in FIG. 3(a), that are presented on the display 10 and are available to be selected by a user. Although text will be used to describe the exemplary embodiments, it should be understood that the exemplary embodiments apply equally to any suitable object that can be displayed on the device 1. Also, although the text, such as for example text 15 in FIG. 4(a), is generally depicted in the figures in the English language, any suitable language, text characters or objects can be used.

Figure 4B:
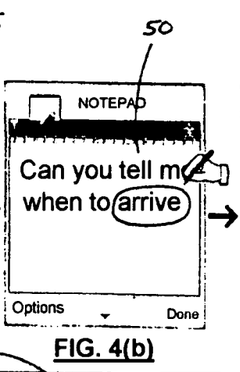

In one embodiment, the stroke based selection algorithm 14A, as seen in FIG. 1, may be used to detect if an area or object on the display 10 has been enclosed or marked by a user (i.e. the selection stroke 50) so that an object 10A may be selected. For example, the user partially or substantially encloses the text to be edited using a selection stroke 50 as can be seen in FIGS. 4(a) and 4(b). In one embodiment, and as will be described below, the stroke 50 does not need to be a completely closed shape as can be seen best in FIGS. 1 and 6. The selection stroke 50 may be formed by the user via a stroke in any suitable direction such as for example, left, right, up, down, clockwise or counterclockwise. The selection stroke may take any shape that is sufficient to generally encompass or enclose the desired object(s), such as text 15, that is to be selected.

Figures 6A, 6B:
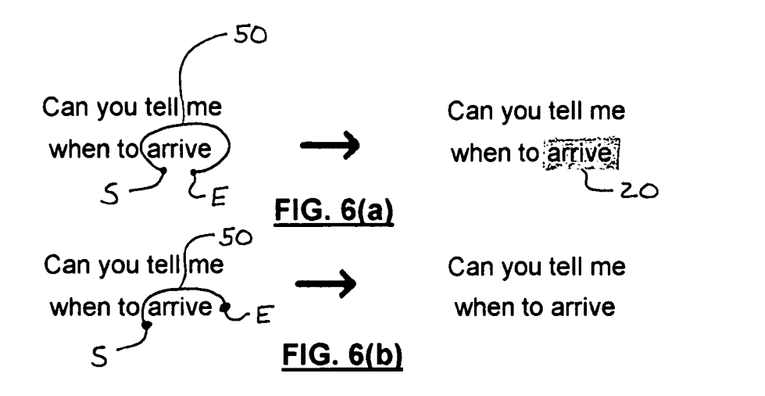
FIG. 6 illustrates selection of an object in accordance with an exemplary embodiment.

The selection stroke 50 need not be a completely closed shape in order to select a text segment 20. In accordance with this exemplary embodiment, when the start and end points S, E of a selection stroke 50, as can be seen in FIG. 6(a), are within a predetermined distance from each other, the text selection is recognized and accepted as valid by the stroke based selection algorithm 14A and the object is selected. In one embodiment, the start and end points S, E are in close proximity to each other. In alternate embodiments, the start and end points S, E can be any suitable distance from each other. As such, the user may proceed with subsequent editing operations as will be described below. If the start and end points S, E of the selection stroke 50 are not within a predetermined distance from each other as shown for example, in FIG. 6(b), the selection is not recognized by the stroke based selection algorithm 14A, the object or character is not selected and the edit sequence or routine is not activated. In one embodiment, the predetermined distance between the start and end points S, E of the selection stroke 50 may vary depending on the language being used.

Figure 7:
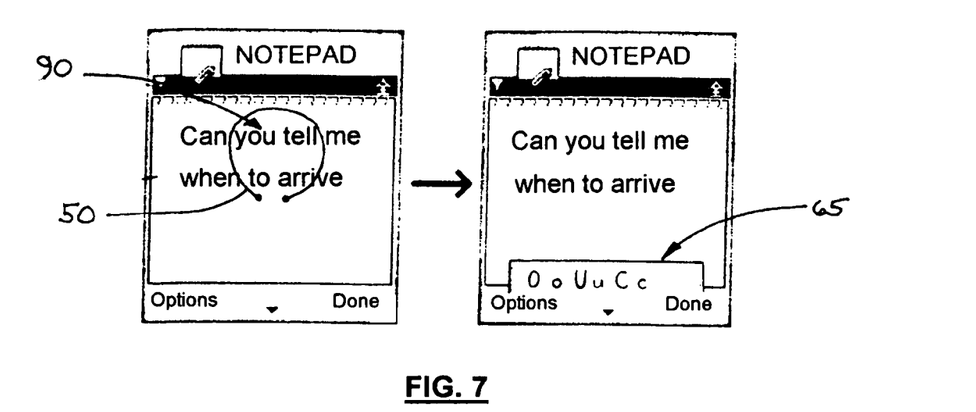
FIG. 7 illustrates selection of an object in accordance with an exemplary embodiment.
Figure 14A:
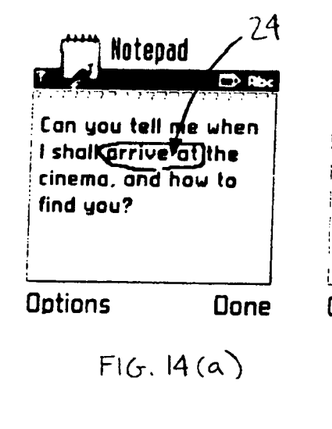
FIG. 14 illustrates one embodiment of the selection of an object in accordance with an exemplary embodiment.
Figure 14B:
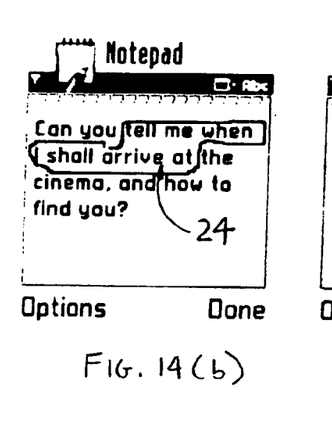
Figure 14C:
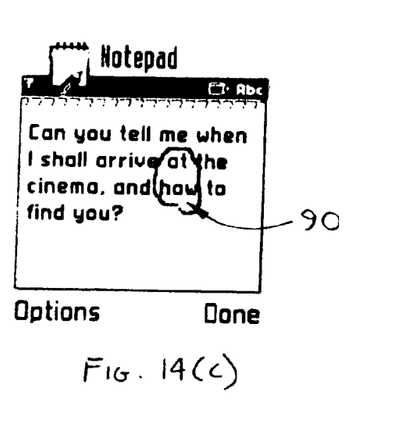

In one embodiment, the user may partially or substantially enclose or encompass a single object or multiple objects with a selection stroke 50. For example, referring to FIGS. 4(a)-(c), 14(a) and 14(b), if multiple objects are to be selected the objects must be in a continuous relationship to each other, such as characters 24. The characters 24 may be for example, a series of objects or letters adjacent to each other such as the letters forming a word. In alternate embodiments, characters 24 may be for example, a string of characters or objects comprising a whole paragraph or a complete sentence. If the selected text does not represent a character string such as for example, the text 90 as shown in FIGS. 7 and 14(c), the selection is not recognized as valid by the stroke based selection algorithm 14A and no object is selected. Rather, the attempted selection of non-continuous text may activate a text recognition function 65, as seen in FIG. 7, that presents the user with object or text options (i.e. characters) that resemble the shape of the stroke 50 used to enclose the non-continuous text. The user may choose to insert one of the characters or objects displayed by the text recognition function 65 into the document or onto the display 10.

Figure 8:
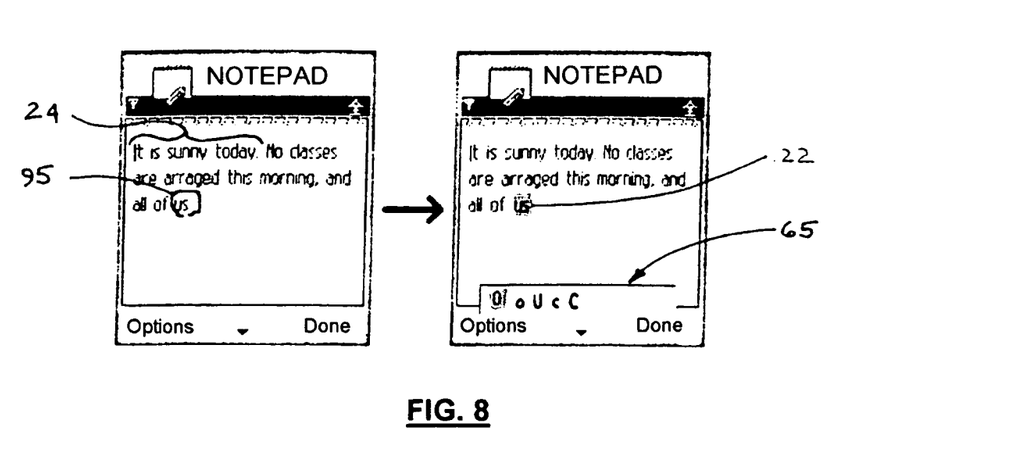
FIG. 8 illustrates selection of an object in accordance with an exemplary embodiment.

In alternate embodiments, such as where the device 1 is configured to be used with the English language, a valid selection stroke 50 may resemble a character in the English language such as the letter "O" or "U". In one embodiment, where the valid selection stroke does resemble a character in the English language, the stroke based selection algorithm 14A may both recognize the selection as valid as well as activate a text recognition function 65. For example, the selection stroke 95, as shown in FIG. 8, encloses the character string "us". Even though a character string has been enclosed, the selection stroke 95 also resembles the letter "O". As such, the stroke based selection algorithm 14A recognizes the object selection as valid and selects the enclosed text, while at the same time, activates a text recognition function 65 allowing the user to choose between whether the selected text 20 is to be edited in accordance with this exemplary embodiment or if the inputted character, i.e. the letter "O", is to be interpreted using the text recognition function 65.

Figures 4C, 4D:
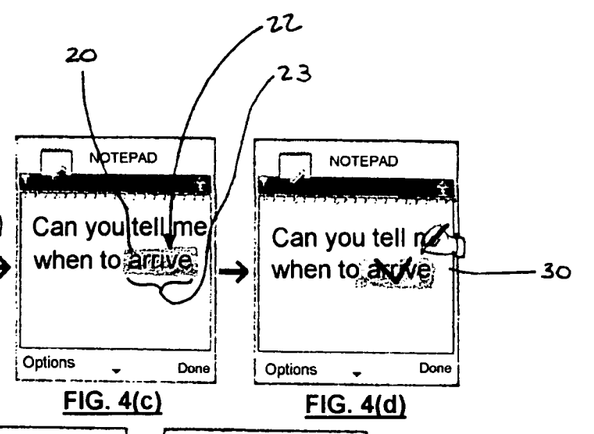
Figure 10:
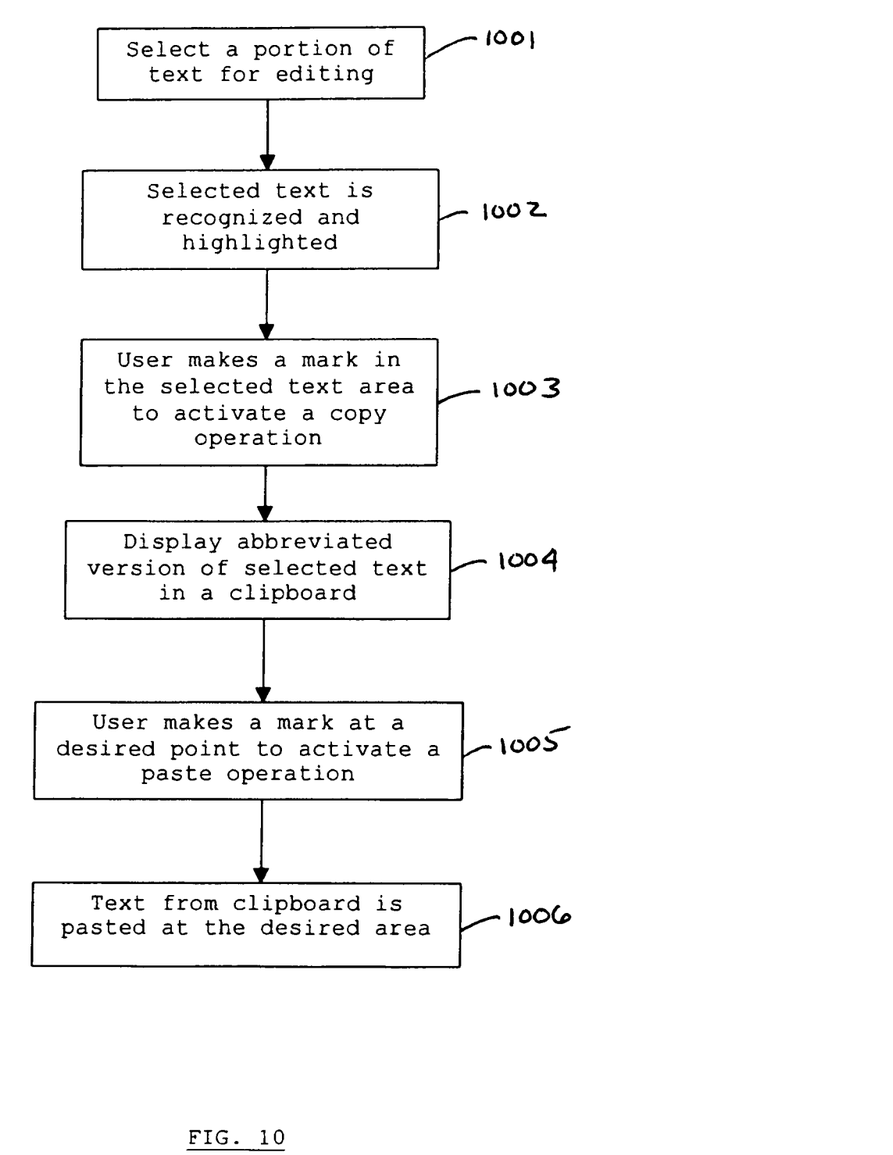
FIG. 10 is a block diagram in accordance with a method of an exemplary embodiment.

Referring to FIGS. 4(a) through 4(g) and FIG. 10, the user selects a portion of text 20 to be edited using a selection stroke 50 (block 1001, FIG. 10). Once the selection stroke 50 is recognized the text 20 is selected and highlighted 22. The selected and highlighted text 23, as seen in FIG. 4(c), may include for example, characters 24, which are in a continuous relationship to each other, as discussed above. The selection of the text 20, made in the manner described above, is automatically recognized by the stroke based selection algorithm 14A at the point in time when the pointing device 11 leaves or substantially breaks contact with the touch screen 10 (block 1002, FIG. 10). A marked selection area 22 may indicate the selected text 23. The marked selection area 22 may be highlighted or shaded as shown in FIG. 4(c) (block 1002, FIG. 10). In alternate embodiments, the selection area may be highlighted in any suitable manner, including for example a hatch pattern as shown in FIG. 3(b). In yet other alternate embodiments, the selection area may be highlighted with for example, a colored background.

Figures 4E, 4F, 4G:
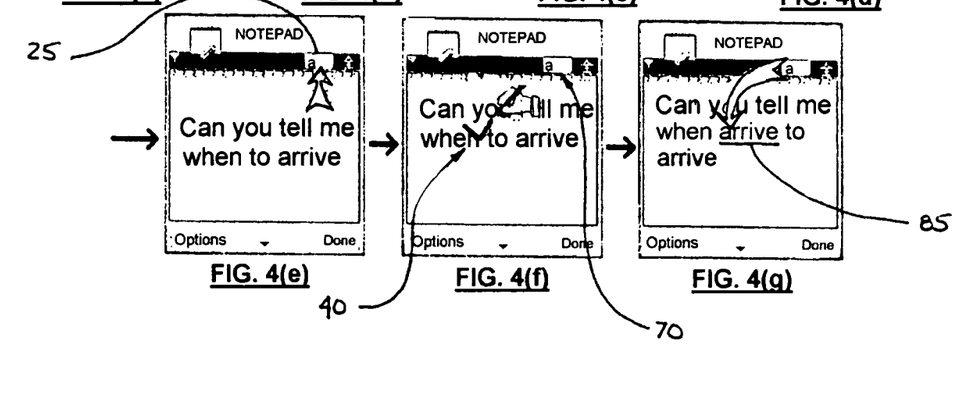
Figure 5A:
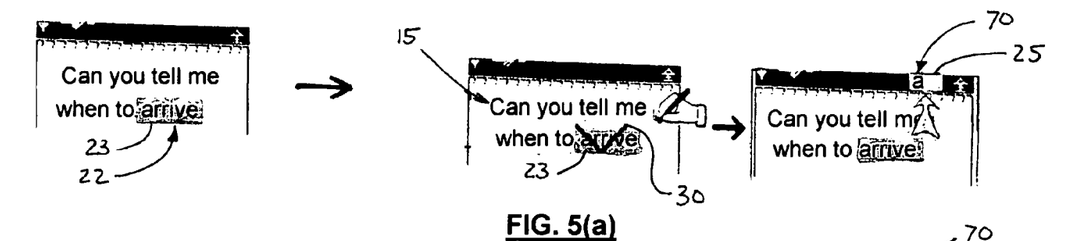
FIGS. 5(a)-5(d) illustrate object editing in accordance with an exemplary embodiment.
Figure 5B:
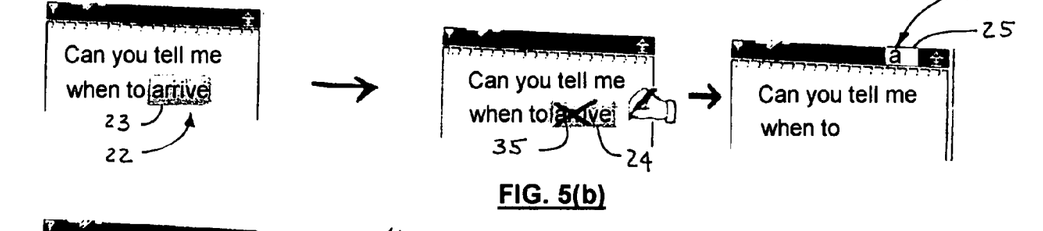
Figure 5C:
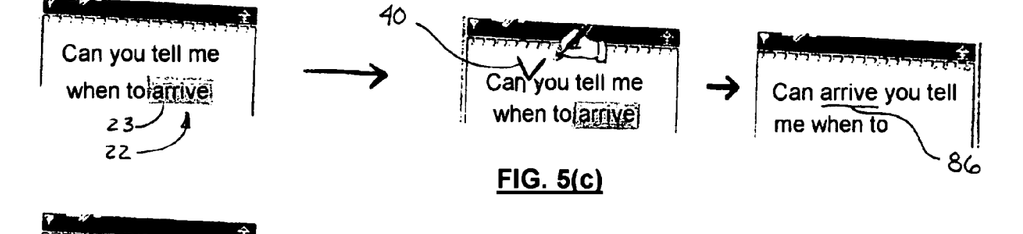
Figure 5D:
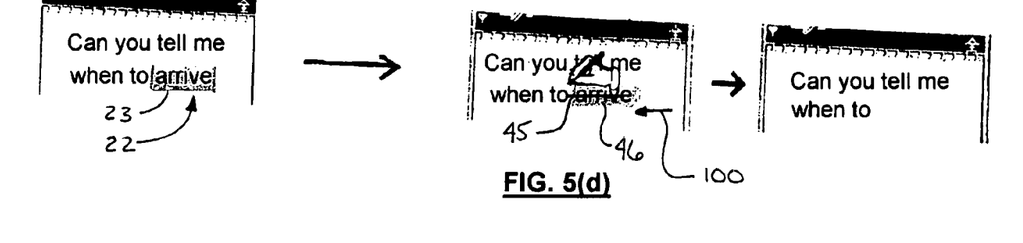

Once the selected text 23 is recognized by the stroke based selection algorithm 14A, the user may manipulate the selected text 23 via gestures or movements made with the pointing device 11 substantially or at least partially in contact with the touch screen 10 over the selected area 22. In one embodiment, it may not be necessary for the pointing device 11 to make physical contact with the touch screen 10 in order to form a mark. As shown in FIG. 4(d), in order to initiate an editing function, the user makes or forms a mark over the selected text 23. The mark, for example mark 30, can include any suitable mark or marking formed by substantially contacting the pointing device 11 to the display 10 and moving the pointing device 11 over the selected area 22. For example, in one embodiment and as shown in FIG. 4(d), the user has caused a "V" or check shaped mark to appear over the selected area 22. In one embodiment, the "V" or check symbolizes or causes a copying editing function to activate. In alternate embodiments, any predetermined or pre-defined symbols, characters or markings can be used to initiate specific editing functions. In one embodiment, the manipulation of the selected text 23 may include editing functions such as for example, copy, cut, paste and delete operations. In alternate embodiments, any suitable text or image editing functions can be used. For example, referring to FIGS. 4(d) and 5(a), a copy and paste operation will now be described. In one embodiment, the user makes a mark or pen stroke 30, in the selected text area 22, which is substantially shaped like the letter "V". In accordance with this exemplary embodiment, the substantially "V" shaped mark 30 represents or activates a copy operation (block 1003, FIG. 10). The point in time at which the copy operation is activated is when, after making or forming the mark 30, the pointing device 11 is substantially lifted off or moved away from the display 10. When the selected text 23 is copied, as that term is commonly understood, an abbreviated version 70 of the selected text 23 is displayed and stored on a clipboard 25, as can be seen in FIGS. 4(e), 4(f) and 5(a) (block 1004, FIG. 10). In alternate embodiments, any suitable indication that the selected text has been copied may be employed. The abbreviated version 70 of the selected text may include a portion of the selected text such as for example, only the first few characters of the selected text. In alternate embodiments, when an object such as for example, a figure or drawing is selected, a miniature version of the figure or drawing or only a portion of the figure or drawing may be displayed on the clipboard. In alternate embodiments, any suitable abbreviation may be used to represent the selected object placed on the clipboard.

In this exemplary embodiment, the user may paste the selected text 23 or object for example, in any suitable area on the display 10. For example, in one embodiment, the user may paste the selected text 23 or object in a document as can be seen in FIGS. 4(f) and 4(g). In alternate embodiments, the user may paste the selected text 23 or object in another document or application that may be stored in or available to the device 1. In one embodiment, the paste operation may be activated by a second substantially "V" shaped mark 40 that is made by the user at the desired point or area within the document as shown in FIG. 4(f) (block 1005, FIG. 10). The paste operation is recognized, after making or forming the second mark 40, when the pointing device 11 is substantially lifted off of or moved away from the display 10. Upon recognition of the paste operation by the stroke based selection algorithm 14A, the selected text 23 is pasted from the clipboard 25 to the point or area previously selected by the user, i.e. where the mark 40 has been made (block 1006, FIG. 10).

In accordance with this exemplary embodiment, the mark 30 representing the copy operation and the second mark 40 representing the paste operation are both substantially "V" shaped. However, in alternate embodiments any suitably shaped pen strokes can be used to initiate the copy and paste operations. As can be seen in FIG. 4(*g*), as a result of the paste operation, the selected text 23 is inserted into the document as pasted text 85. In one embodiment, the selected and copied text 23 is placed and stored on the clipboard 25. As such, the selected text 23 may be pasted into the document numerous times if desired, without reselecting the text 20, as described above.

Figure 11:
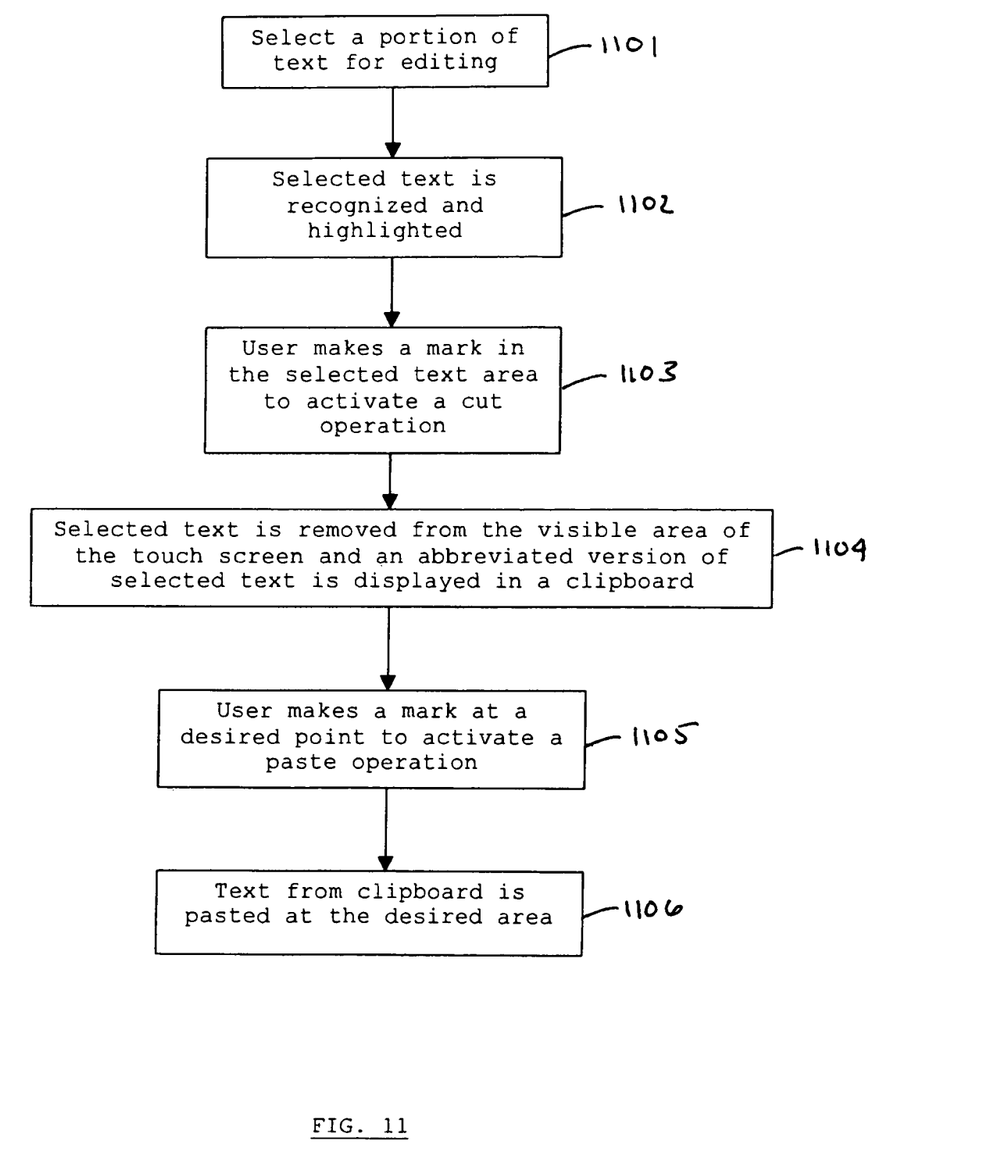
FIG. 11 is a block diagram in accordance with another method of an exemplary embodiment.

Referring now to FIGS. 5(*b*) and 11, a cutting and pasting function in accordance with an exemplary embodiment, will now be described. In this exemplary embodiment, a portion of text 23 is selected in a substantially similar manner as described above (blocks 1101 and 1102, FIG. 11). In one embodiment, to activate the cut operation, as that operation is commonly understood, the user makes or forms a mark 35 within the selected text area 22 using the pointing device 11, as can be seen in FIG. 5(*b*) (block 1103, FIG. 10). In this embodiment, the mark 35 is substantially in the form of an "X". In alternate embodiments, any suitably shaped stroke may be utilized to activate the cut operation. The cut operation is recognized when the pointing device 11 is substantially lifted off of or moved away from the display 10 after making or forming the substantially "X" shaped mark 35. When the cut operation is recognized by the stroke based selection algorithm 14A, the selected text 23 is cut or removed from the visible area of the display 10 or document, as seen in FIG. 5(*b*) (block 1104, FIG. 11). In one embodiment, the cut text 24 is placed and stored on the clipboard 25 so that an abbreviated version 70 of the cut text 24 is shown on the clipboard 25, as can be seen in FIG. 5(*b*) (block 1104, FIG. 11). The user may paste the cut text 24 from the clipboard 25 into the document or application in a manner substantially similar to that described above for the copy and paste operation (blocks 1105 and 1106, FIG. 11). Again, because the cut text 24 is placed or stored on the clipboard 25 the cut text 24 may be inserted into the document any desired number of times.

Figure 12:
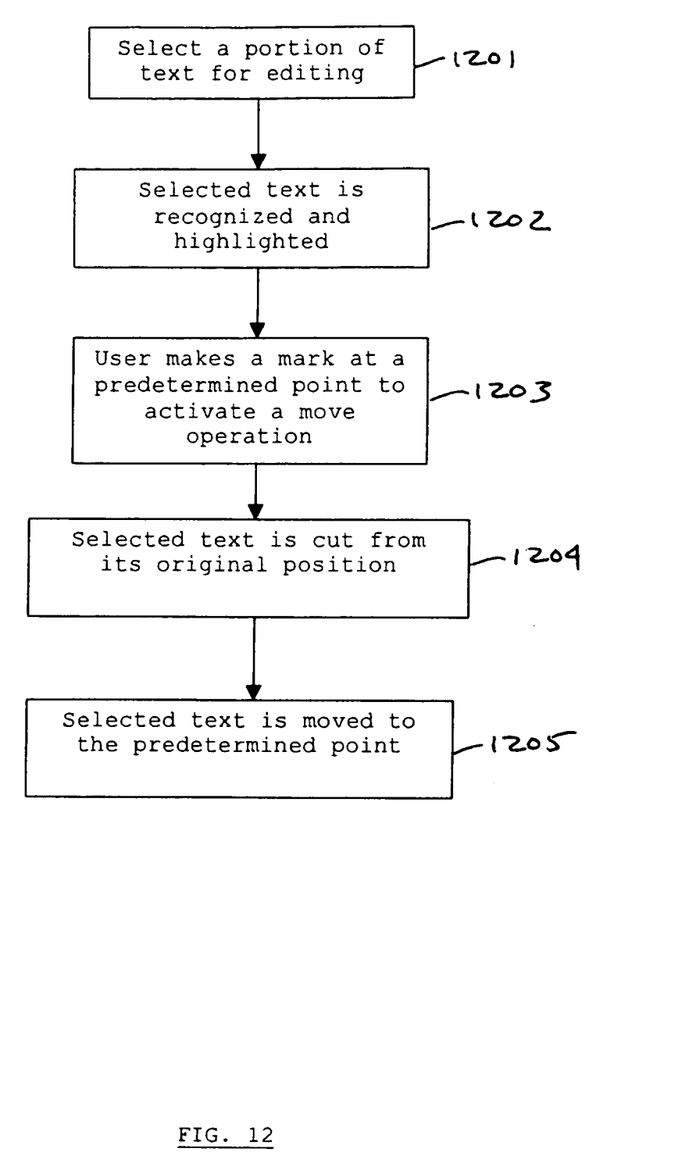
FIG. 12 is a block diagram in accordance with still another method of an exemplary embodiment.

Referring now to FIGS. 5(*c*) and 12, a move operation in accordance with an exemplary embodiment will now be described. In this exemplary embodiment, a portion of text 23 is selected in a substantially similar manner as described above (blocks 1201 and 1202, FIG. 12). In one embodiment, to activate the move operation, as that operation is commonly understood, the user may make or form a substantially "V" shaped mark or stroke 40 at the predetermined point within the document, as shown in FIG. 5(*c*) (block 1203, FIG. 12). In alternate embodiments, any suitably shaped mark may be used to activate the move operation. The move operation is recognized by the stroke based selection algorithm 14A when the pointing device 11 is substantially lifted off of or moved away from the display 10 after the user makes or forms the mark 40. Upon recognition of the move operation, the selected text 23 is cut from its original position on the display 10, within the document or within the application and moved to the position indicated by the substantially "V" shaped mark 40 without being placed on the clipboard 25, as can be seen in FIG. 5(*c*) (blocks 1204 and 1205, FIG. 12). Because the moved text 86 is not placed on the clipboard 25 during the move operation, the text 86 may be reselected each time the text 86 is to be moved to another place within the document or on the display.

Figure 13:
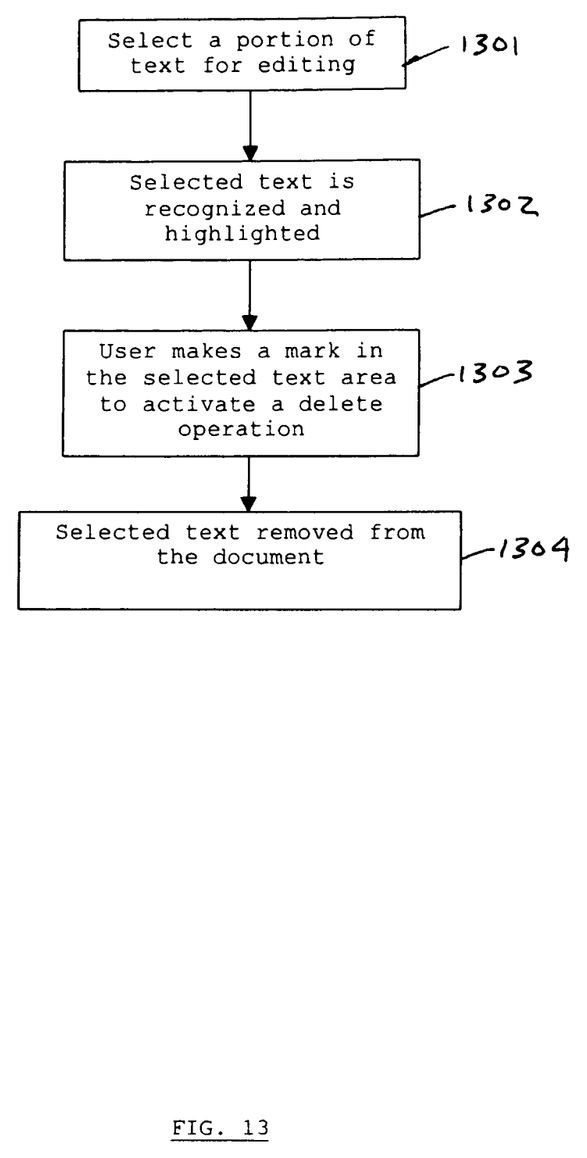
FIG. 13 is a block diagram in accordance with yet another method of an exemplary embodiment.

Referring now to FIGS. 5(*d*) and 13, a delete operation in accordance with yet another exemplary embodiment will now be described. In this exemplary embodiment, a portion of text 23 is selected in a substantially similar manner as discussed above (blocks 1301 and 1302, FIG. 13). In one embodiment, to activate the delete operation, as that operation is commonly understood, the user may make or form a gesture or mark 45 substantially over the selected text 23, as can be seen in FIG. 5(*d*) (block 1303, FIG. 13). In this embodiment, the gesture or mark 45 is in the form of a substantially straight line. In alternate embodiments, any suitable mark may be utilized to activate the delete operation. The mark 45 may be made substantially within the selected text area 22 and in, for example, the general direction of arrow 100. In alternate embodiments, the mark 45 may be made in any predetermined direction. The delete operation is recognized by the stroke based selection algorithm 14A when the pointing device 11 is substantially lifted off of or moved away from the display 10 after making or forming the mark 45. When the delete operation is recognized, the deleted text 46 is removed from the document without being placed on the clipboard 25, as can be seen in FIG. 5(*d*) (block 1304, FIG. 13).

Although the foregoing description is in the context of a full screen user interface input mode it, should be understood that the exemplary embodiments apply to box-based pen user interfaces or any other suitable type of interface as well.

Figure 9:
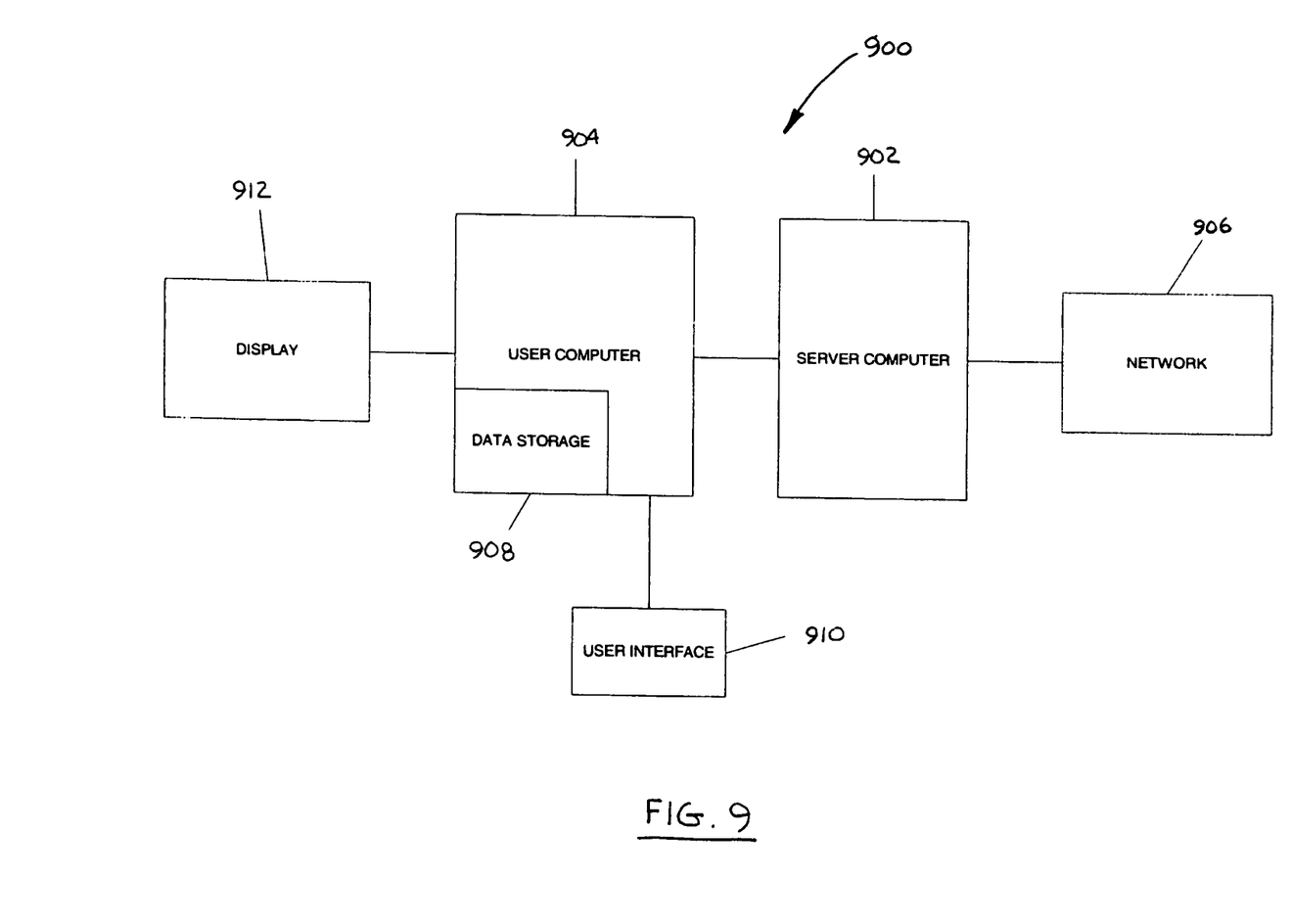
FIG. 9 is a block diagram of one embodiment of a typical apparatus incorporating features of the present invention that may be used to practice the present invention.

The present invention may also include software and computer programs incorporating the process steps and instructions described above that are executed in different computers. FIG. 9 is a block diagram of one embodiment of a typical apparatus 900 incorporating features of the present invention that may be used to practice the present invention. As shown, a computer system 902 may be linked to another computer system 904, such that the computers 902 and 904 are capable of sending information to each other and receiving information from each other. In one embodiment, computer system 902 could include a server computer adapted to communicate with a network 906. Computer systems 902 and 904 can be linked together in any conventional manner including a modem, hard wire connection, or fiber optic link. Generally, information can be made available to both computer systems 902 and 904 using a communication protocol typically sent over a communication channel or through a dial-up connection on ISDN line. Computers 902 and 904 are generally adapted to utilize program storage devices embodying machine readable program source code which is adapted to cause the computers 902 and 904 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 902 and 904 may also include a microprocessor for executing stored programs. Computer 902 may include a data storage device 908 on its program storage device for the storage of information and data. The computer program or software incorporating the processes and method steps incorporating features of the present invention may be stored in one or more computers 902 and 904 on an otherwise conventional program storage device. In one embodiment, computers 902 and 904 may include a user interface 910, and a display interface 912 from which features of the present invention can be accessed. The user interface 908 and the display interface 912 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for editing characters on a device having a touch screen, embodied on a non-transitory computer readable medium, which when executed, comprises:
    receiving a first input in the form of a first path formed on the touch screen, the first path having a starting point and an ending point;
    detecting when the first path is a valid selection stroke by (1) verifying that the first path at least partially encloses multiple characters within the bounds of an area defined by the first path by comparing the distance between the starting point and ending point to a predetermined distance, and (2) verifying that when multiple characters are at least partially enclosed within the bounds of the area defined by the first path that the multiple characters are in a continuous relationship to each other and form a word, sentence, or paragraph;
    selecting and highlighting the multiple characters when a valid selection stroke is detected; and
    wherein when the first path is detected by (1) verifying the first path at least partially encloses multiple characters within the bounds of an area defined by the first path by comparing the distance between the starting point and ending point to a predetermined distance, and (2) verifying that when multiple characters are at least partially enclosed within the bounds of the area defined by the first path that the multiple characters are not in a continuous relationship to each other and form a word, sentence, or paragraph,
    a text recognition function is activated, wherein the text recognition function displays on the touch screen a shape resembling the first path.

2. The method of claim 1, further comprising recognizing the selection of the multiple characters as valid and activating the text recognition function when a valid selection stroke resembles a character of a preselected language.

3. The method of claim 1, further comprising receiving a second input in the form of a second path formed on the touch screen after selecting and highlighting the multiple characters.

4. The method of claim 3, further comprising initiating an editing function after receiving the second input.

5. The method of claim 4, wherein the editing function is a delete operation and the multiple characters are deleted.

6. The method of claim 4, wherein the editing function is a move operation and the multiple characters are moved to a location indicated by the second path.

7. The method of claim 4, wherein the editing function displays an abbreviated version of the multiple characters on a visible clipboard within the touch screen.

8. An apparatus comprising:
    a display processor;
    an input detection unit coupled to the display processor for receiving a first input in the form of a first path having a starting point and an ending point;
    an input recognition unit coupled to the display processor for:
    detecting when the first path is a valid selection stroke by (1) verifying that the first path at least partially encloses multiple characters within the bounds of an area defined by the first path by comparing the distance between the starting point and ending point to a predetermined distance, and (2) verifying that when the multiple characters are at least partially enclosed within the bounds of the area defined by the first path that the multiple characters are in a continuous relationship to each other and form a word, sentence, or paragraph; and
    selecting and highlighting the multiple characters when a valid selection stroke is detected; and
    wherein when the first path is detected by (1) verifying the first path at least partially encloses multiple characters within the bounds of an area defined by the first path by comparing the distance between the starting point and ending point to a predetermined distance, and (2) verifying that when multiple characters are at least partially enclosed within the bounds of the area defined by the first path that the multiple characters are not in a continuous relationship to each other and form a word, sentence, or paragraph,
    an editing unit coupled to the display processor for activating a text recognition function is activated, wherein the text recognition function causes the display processor to display a shape resembling the first path.

9. The apparatus of claim 8, wherein the editing unit recognizes the selection of the multiple characters as valid and activates the text recognition function when a valid selection stroke resembles a character of the preselected language.

10. The apparatus of claim 8, wherein the input detection unit receives a second input in the form of a second path after selecting and highlighting the multiple characters.

11. The apparatus of claim 10, wherein the editing unit initiates an editing function after receiving the second input.

12. The apparatus of claim 11, wherein the editing function is a delete operation and the multiple characters are deleted.

13. The apparatus of claim 11, wherein the editing function is a move operation and the multiple characters are moved to a location indicated by the second path.

14. The apparatus of claim 11, wherein the editing function causes the display processor to display an abbreviated version of the multiple characters.

15. An apparatus comprising: a touch screen; a processor; and
    a memory including computer program code, the memory and the computer program code configured to, with the processor, cause the apparatus at least to:
    receive a first input in the form of a first path having a starting point and an ending point;
    detect when the first path is a valid selection stroke by (1) verifying that the first path at least partially encloses multiple characters within the bounds of an area defined by the first path by comparing the distance between the starting point and ending point to a predetermined distance, and (2) verifying that when the multiple characters are at least partially enclosed within the bounds of the area defined by the first path that the multiple characters are in a continuous relationship to each other and form a word, sentence, or paragraph;
    select and highlight the multiple characters when a valid selection stroke is detected; and
    wherein when the first path is detected by (1) verifying the first path at least partially encloses multiple characters within the bounds of an area defined by the first path by comparing the distance between the starting point and ending point to a predetermined distance, and (2) verifying that when multiple characters are at least partially enclosed within the bounds of the area defined by the first path that the multiple characters are not in a continuous relationship to each other and form a word, sentence, or paragraph, a text recognition function is activated, wherein the text recognition function displays on the touch screen a shape resembling the first path.

* * * * *